United States Patent
Watanabe et al.

(10) Patent No.: US 7,024,513 B2
(45) Date of Patent: Apr. 4, 2006

(54) CONTROLLER AND DATA PROCESSING SYSTEM

(75) Inventors: Kaneo Watanabe, Bisai (JP); Masayuki Ishibashi, Yao (JP); Hiroyuki Tsuda, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 747 days.

(21) Appl. No.: 09/876,530

(22) Filed: Jun. 7, 2001

(65) Prior Publication Data

US 2001/0052048 A1 Dec. 13, 2001

(30) Foreign Application Priority Data

Jun. 8, 2000 (JP) .................................... 2000-172642

(51) Int. Cl.
*G06F 12/00* (2006.01)

(52) U.S. Cl. .................. 711/103; 711/102; 365/189.01; 365/189.03

(58) Field of Classification Search ................. 711/102, 711/103; 365/189.01, 189.03
See application file for complete search history.

(56) References Cited

U.S. PATENT DOCUMENTS

| | | | |
|---|---|---|---|
| 5,210,854 A * | 5/1993 | Beaverton et al. | 717/174 |
| 5,408,624 A * | 4/1995 | Raasch et al. | 717/173 |
| 5,566,335 A * | 10/1996 | Nash et al. | 713/1 |
| 5,603,056 A * | 2/1997 | Totani | 710/8 |
| 5,729,683 A * | 3/1998 | Le et al. | 709/237 |
| 5,878,256 A * | 3/1999 | Bealkowski et al. | 713/2 |
| 6,009,500 A * | 12/1999 | Rossi | 711/162 |
| 6,170,043 B1 * | 1/2001 | Hu | 711/158 |
| 6,507,881 B1 * | 1/2003 | Chen | 710/305 |
| 2003/0009607 A1 * | 1/2003 | Chen | 710/1 |
| 2003/0041182 A1 * | 2/2003 | Martwick | 710/1 |

OTHER PUBLICATIONS

IBM Technical Disclosure Bulletin, "Personal Computer System to Intel 80452–Based Adapter Download Algorithm," pp312–319, vol. 32, Iss. 9B, Feb. 1990.*
IBM Technical Disclosure Bulletin, "Method for Downloading Firmware to Ram," pp 342–346, vol. 33, Iss. 7, Dec. 1990.*
Patent Abstracts of Japan, Publication No. 08–161160, Publication Date: Jun. 21, 1996, Title: Method for Updating Firmware of Optical Disk Reproducing Device.
Patent Abstracts of Japan, Publication No. 08–305561, Publication Date Nov. 22, 1996.
Patent Abstracts of Japan, Publication No. 09–101887, Publication Date Apr. 15, 1997.
Patent Abstracts of Japan, Publication No. 2000–112745, Publication Date Apr. 21, 2000.

* cited by examiner

*Primary Examiner*—Matthew Kim
*Assistant Examiner*—Stephen Elmore
(74) *Attorney, Agent, or Firm*—Fish & Richardson P.C.

(57) ABSTRACT

A low-cost controller that operates in accordance with firmware stored in a memory. The controller includes a data processing circuit that performs predetermined processing on data and generates processed data. A write wire is connected to the memory, and a terminal is provided for use in the output of the data processed by the data processing circuit and/or the provision of the data to the data processing circuit. The controller includes a selector for connecting the write wire and the terminal to write the firmware to the memory.

12 Claims, 2 Drawing Sheets

CONTROLLER AND DATA PROCESSING SYSTEM

BACKGROUND OF THE INVENTION

The present invention relates to a controller that operates in accordance with a program stored in a firmware storing memory, and, more particularly, to a controller mounted on an apparatus that performs the input and output of data with a computer.

Electronic apparatus mounts a microcomputer and a controller that controls the electronic apparatus in accordance with a command from the microcomputer. For example, the controller is mounted on not only computer peripheral device that performs the input and output of data with a computer and, but also electrical appliances, such as a CD player and a television set.

The program for operating the microcomputer is called firmware. The firmware is stored in a firmware storing memory connected to the microcomputer.

FIG. 1 is a schematic block diagram of a CD-ROM drive 40 as conventional computer peripheral device. The CD-ROM drive 40 is connected to a personal computer 30, and reads data recorded on an optical disc 20.

The CD-ROM drive 40 includes a pickup 2, a sled 3, a data processing circuit 4, a buffer RAM 5, a microcomputer 6, a firmware storing memory 7, and a connector 8. The data processing circuit 4 includes a data processing portion 9, an error correction portion 10, and an interface 11.

The pickup 2 reads the data recorded on the optical disc 20 by irradiating the predetermined position on the optical disc 20 with laser and reading the reflected light of this laser. The sled 3 moves the pickup 2 to the predetermined position on the optical disc 20. The data read by the pickup 2 is provided to the data processing circuit 4.

The data processing portion 9 of the data processing circuit 4 demodulates read data and stores demodulated data in the buffer RAM 5. The error correction portion 10 receives the demodulated data read from the buffer RAM 5 and performs error correction processing on the data using an error detection code (EDC) and an error correction code (ECC), and then stores error-corrected data in the buffer RAM 5. The interface 11 converts the error-corrected data read from the buffer RAM 5 to format data that conforms to the specifications of the Advanced Technology Attachment Packet Interface (ATAPI) or the Small Computer System Interface (SCSI), for example, and provides the format data to the connector 8. The connector 8 conforms to specifications unified with a connector 31 of the computer 30, for example, the SCSI or ATAPI specifications.

The read operation of the data from the buffer RAM 5 and the alignment of the sled 3 are performed in accordance with the command of the microcomputer 6. The firmware that is the operation program of the microcomputer 6 is stored in the firmware storing memory 7. The microcomputer 6 provides a command that matches various status to the data processing portion 9, the error correction portion 10, and the interface 11 in accordance with the firmware based on the output of the data processing portion 9, the error correction portion 10, and the interface 11 of the data processing circuit 4.

The firmware storing memory 7 can use an electrical writable nonvolatile memory, such as a flash memory or an EPROM, or a write-at-once type memory.

For example, firmware is written to the firmware storing memory 7 in accordance with the following two methods. In the first method, the firmware is written to a single memory using a ROM writer, and subsequently the memory is soldered on the printed circuit board (PC board) of the CD-ROM drive 40. The ROM writer is a data output unit for writing firmware. The ROM writer is directly connected to the firmware storing memory 7 and the firmware is written to the memory 7. The ROM writer can be substituted for a personal computer having an output terminal customized for the firmware storing memory 7. In the first method, after firmware is written, the work of soldering a memory on a PC board becomes necessary, and manufacturing costs increase. Further, since the firmware storing memory 7 cannot be integrated into an LSI (large scale integrated circuit) of a controller, the controller becomes large.

In the second method, a CD-ROM drive is manufactured without writing firmware to the firmware storing memory 7, and the firmware is written to the memory 7 after the CD-ROM drive is manufactured. The second method applies to the case where the firmware storing memory 7 is integrated into the LSI of the controller, for example. To write firmware to the firmware storing memory 7, the microcomputer 6 needs to be operated in accordance with a predetermined write program. However, the microcomputer 6 operates only when firmware is provided. Accordingly, a program for writing firmware is recorded in the microcomputer 6, and a mask ROM 12 having a relatively low capacity is connected. When firmware is written to the memory 7, a ROM writer for writing firmware is connected to the connector 8, and the firmware is written to the memory 7 when the microcomputer 6 operates in accordance with the program of the mask ROM 12. The program recorded in the mask ROM 12 is used to write firmware in the memory 7. Accordingly, the capacity of the mask ROM 12 is lower than that of a memory that stores all firmware. However, this mask ROM 12 is used only when it writes the firmware. Consequently, installing the mask ROM 12 increases the cost of a controller and increases the area of the integrated circuit of the controller.

SUMMARY OF THE INVENTION

An object of the present invention is to provide a low-cost controller that operates in accordance with firmware.

In a first aspect of the present invention, there is provided a controller of a system connected to a memory, which stores firmware, for operating in accordance with the firmware stored in the memory. The controller includes a data processing circuit that performs predetermined processing on data and generates processed data, a write wire connected to the memory, and a terminal for used in the output of the data processed by the data processing circuit and/or the provision of the data to the data processing circuit. The controller connects the write wire and the terminal to write the firmware to the memory.

In a second aspect of the present invention, there is provided a controller of a system that operates in accordance with firmware stored in a firmware storing memory. The controller includes a first terminal for receiving and providing data between the controller and an external device, a data processing circuit for performing predetermined processing on the data to be provided to and received from the external device via the first terminal, and a firmware write wire connected to the firmware storing memory. The control circuit selectively connects the first terminal and one of the data processing circuit and the firmware write wire.

In a third aspect of the present invention, there is provided a data processing system connected to an external device via a connector for receiving and providing data between the external device. The system includes a memory for storing firmware, and a microcomputer connected to the memory for operating in accordance with the firmware stored in the memory. The firmware is written to the memory by directly connecting the memory and the connector.

In a fourth aspect of the present invention, there is provided a data processing system connected to an external device via a connector for receiving and providing data between the external device. The system includes a memory for storing firmware, a microcomputer connected to the memory for performing control operation in accordance with the firmware stored in the memory, a data processing circuit connected to the microcomputer for performing predetermined processing on data to be provided to and received from the external device in accordance with the control of the microcomputer, and a selector connected to the data processing circuit and the memory for selectively connecting the connector and one of the data processing circuit and the memory. The firmware is written to the memory via the connector when the selector connects the connector and the memory.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
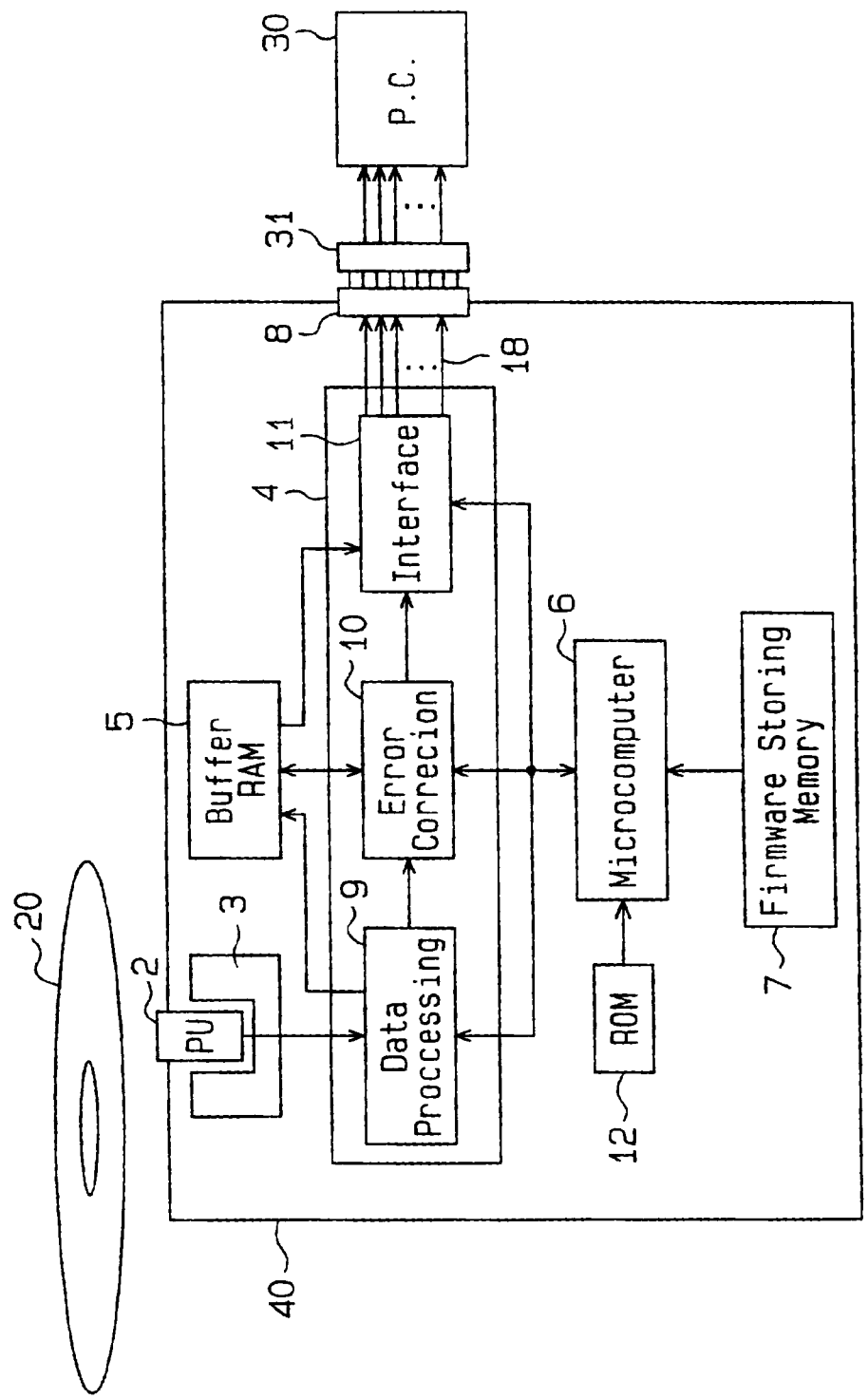
FIG. 1 is a schematic block diagram of a conventional CD-ROM drive.

In the drawings, like numerals are used for like elements throughout.

Figure 2:
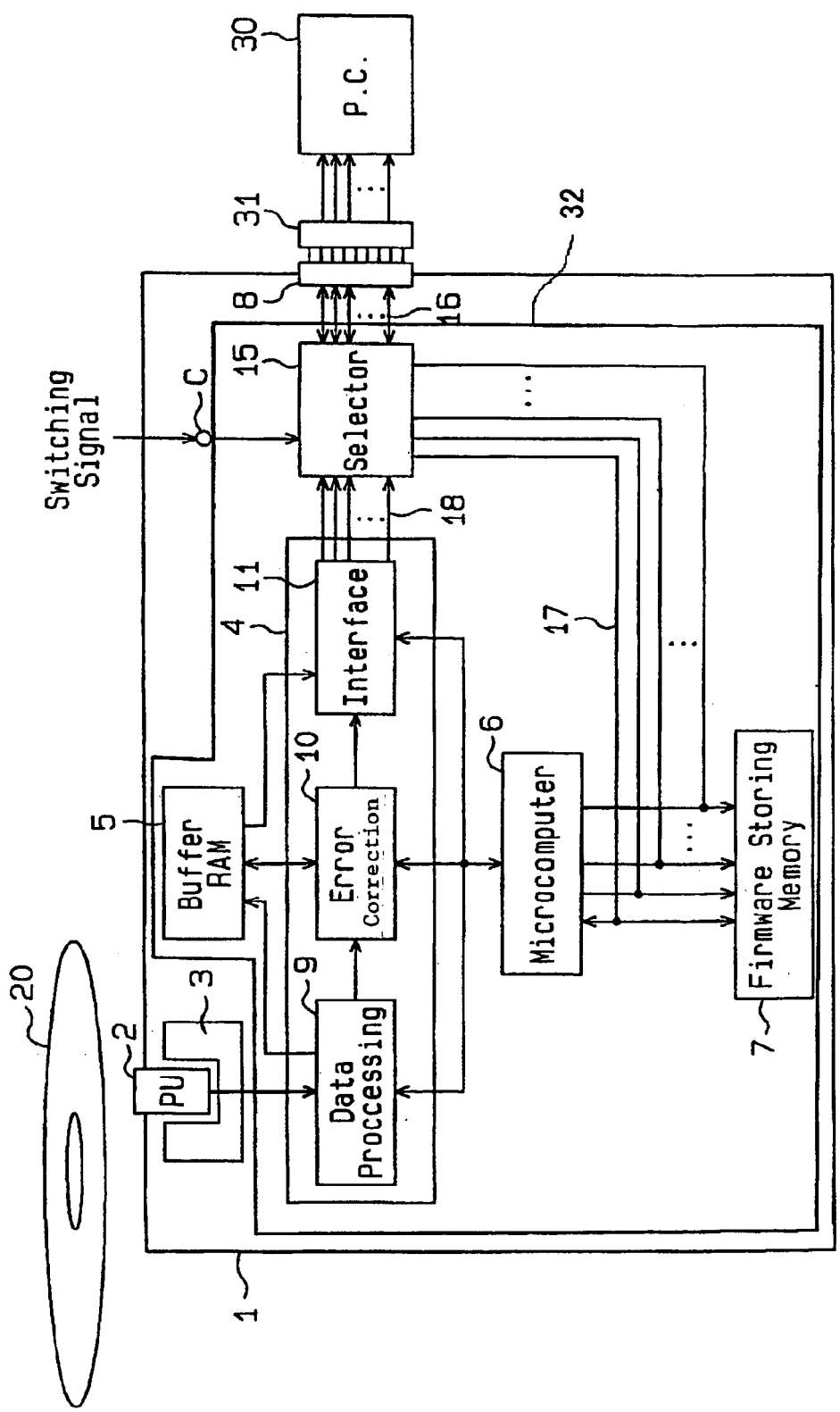
FIG. 2 is a schematic block diagram of a CD-ROM drive according to one embodiment of the present invention.

FIG. 2 is a schematic block diagram of a CD-ROM drive 1 according to a first embodiment of the present invention. The CD-ROM drive 1 is connected to a personal computer 30, and reads data recorded on an optical disc 20.

The CD-ROM drive 1 includes a pickup 2, a sled 3, a data processing circuit 4, a buffer RAM 5, a microcomputer 6, a firmware storing memory 7, a connector 8, and a selector 15. The data processing circuit 4 includes a data processing portion 9, an error correction portion 10, and an interface 11.

The pickup 2 irradiates the optical disc 20 with laser, receives the reflected light of the laser, and reads the data recorded on the optical disc 20. The sled 3 moves the pickup 2 to the predetermined position of the optical disc 20. The data read from the pickup 2 is provided to the data processing circuit 4. The data processing portion 9 of the data processing circuit 4 performs demodulation processing on read data and stores demodulated data in the buffer RAM 5. The error correction portion 10 receives demodulated data read from the buffer RAM 5 and performs error correction processing on the demodulated data using an EDC and an ECC, and then stores error corrected data in the buffer RAM 5. The interface 11 converts the error corrected data read from the buffer RAM 5 into format data that conforms to the ATAPI or SCSI specifications, for example, and provides the format data to the selector 15.

The CD-ROM drive 1 of this embodiment is characterized in that the selector 15 is connected between the interface 11 and the connector 8. The selector 15 receives data from a computer 30 via the connector 8 and provides the data to the interface 11 or the firmware storing memory 7. In this embodiment, a switching signal is preferably provided to the selector 15 via a switching signal input terminal C that is an external terminal of a controller LSI 32. The selector 15 selects the firmware storing memory 7 as long as an active switching signal is provided to the selector 15. The selector 15 selects the interface 11 as long as the active switching signal is not provided to the switching signal input terminal C or the switching signal input terminal C is grounded. The connector 8 conforms to the SCSI or ATAPI specifications, for example, that are unified with a connector 31 of the computer 30.

The firmware storing memory 7 is a programmable ROM (PROM) having a capacity of 64 KB (kilobytes), for example, and twenty seven (27) write wires 17 comprising 16 address lines, eight data lines, one read signal line, one write signal line, and one chip select signal line are connected to the memory 7. That is, the firmware storing memory 7 is connected to the selector 15 via the twenty seven write wires 17.

The connector 8 preferably has 40 terminals that conform to the ATAPI specifications, and is connected to the selector 15 via forty (40) first data wires 16. Among the forty first data wires 16, the thirteen (13) wires are not used for writing the firmware.

The selector 15 is connected to the interface 11 via forty (40) second data wires 18. Usually, when the CD-ROM driver 1 operates, the selector 15 continuously selects the interface 11. This means that the connector 8 is preferably connected to the interface 11. Accordingly, at the time of normal operation, the CD-ROM driver 1 operates in the same manner as the prior art.

The firmware write wires 17 are further described in detail.

The address line is a control wire for specifying the address of the firmware storing memory 7, and the number of address lines is set according to the memory size. In this embodiment, since the memory 7 has a capacity of 64 KB, 16 address lines are necessary.

The data line is a signal wire to which firmware is sent, and the number of data lines is set according to the number of bits of the microcomputer 6. In this embodiment, since the microcomputer 6 is eight bits, eight data lines are necessary.

The write signal line is a wire for providing a control signal that rises when data is written to the firmware storing memory 7.

The read signal line is a wire for providing a control signal that rises when data is read from the firmware storing memory 7.

The chip select signal line is a control wire for selecting writing to a firmware storing memory when the microcomputer 6 is connected to a plurality of memories. When the signal on the chip select signal line is active, writing to the memory 7 is enabled.

Since firmware is not written to the memory 7 of the CD-ROM driver 1 that has just been manufactured in a factory, the microcomputer 6 cannot be operated. To operate the microcomputer 6, the firmware needs to be written to the memory 7. The present invention has features when the firmware is written. How to write the firmware is described below.

First, a firmware writer is connected to the connector 8 via a connector of the same specifications. Next, a switching signal is provided to the switching signal input terminal C of the selector 15, that is, the terminal C is fixed to predetermined potential and the selector 15 is switched so that the connector 8 and the firmware storing memory 7 can be connected. Then the firmware writer makes active the write signal line among the firmware write wires 17 and makes inactive the read signal line, and sets the state in which firmware can be written to the memory 7. Subsequently, the firmware writer outputs firmware and a write control signal in accordance with the terminal arrangement of the firmware storing memory 7 and writes the firmware to the memory 7.

Next, the switching signal input terminal C is connected to ground, and the selector 15 is switched so that the connector 8 and the interface 11 can be connected. Then the firmware writer is removed from the connector 8 and writing of the firmware is terminated.

By switching the selector 15 in this manner, firmware is directly written to the firmware storing memory 7 by the firmware writer. Accordingly, after the firmware is written, the memory 7 needs not to be mounted on a PC board and the mask ROM 12 for writing firmware becomes unnecessary, thereby reducing the manufacturing cost of a controller. Hereupon, the selector 15 performs switching operation in response to a switching signal provided to the switching signal input terminal C. Accordingly, the switching operation of the selector 15 can be performed using the external terminal of the controller LSI 32 as the switching input terminal C. Further, since the connector 8 and the firmware storing memory 7 are connected without passing through the microcomputer 6, writing of the firmware can be performed without operating the microcomputer 6. Further, since the connector 8 for connecting the computer 30 is used as a terminal for writing firmware, it is not necessary to provide an exclusive terminal for writing the firmware, and the increase of costs is prevented.

Moreover, the selector 15 simply switches the connection between the connector 8, the interface 11, and the firmware storing memory 7. Accordingly, it is possible to directly connect a firmware writer with the firmware storing memory and to use the firmware writer that has been conventionally used.

Moreover, when the switching signal input terminal C is grounded, the connection between the interface 11 and the connector 8 is selected. Accordingly, after the controller LSI is shipped by way of writing firmware to the memory 7 and soldering the switching signal input terminal C to a ground wire, the data from the computer 30 is prevented from being incorrectly written to the firmware storing memory 7 and the firmware is prevented from being deleted.

The controller 32 of the CD-ROM drive 1 includes the data processing circuit 4 and is integrated as an LSI. Although the selector 15 may also be mounted outside the LSI as an additional component, it is preferable that the selector 15 be integrated in the LSI. In particular, if the firmware storing memory 7 is integrated in the LSI, the firmware write wires 17 are also integrated in the LSI. So, the controller 32 is made more compact and the manufacturing costs are reduced. The microcomputer 6 and the buffer RAM 5 may also be integrated in the LSI.

It should be apparent to those skilled in the art that the present invention may be embodied in many other specific forms without departing from the spirit or scope of the invention. Particularly, it should be understood that the invention may be embodied in the following forms.

The present invention may also be applied to not only a CD-ROM drive, but also apparatus connected to a computer, for example, an optical disc drive, such as an MD or a DVD-RAM, and a magneto optical disc drive (MO). Since a magnetic disc drive, such as a hard disc, mainly differs from the CD-ROM drive in that a pickup is substituted for a magnetic head, the present invention can also apply to the magnetic disc drive.

Further, the present invention may also apply to not only an information recorder, but also apparatus connected to a computer, for example, an output unit, such as a printer, a reader, such as a scanner, and a communication device, such as a modem and a LAN.

Moreover, the present invention can also apply to the controller of apparatus that is not connected to a computer, for example, a CD player and a television set. For example, since the television set have an image output terminal and two audio output terminals, a selector is connected between these terminals and an internal circuit, and firmware may be written from a firmware writer to a memory via these terminals. However, since the number of terminals of the apparatus that is not connected to the computer is relatively small, the selector 15 that time-divisionally connects the terminal and the firmware storing memory 7 becomes necessary.

On the contrary, the apparatus connected to the computer has connectors of multiple terminals, such as SCSI and ATAPI connectors. For example, the ATAPI connector has 40 terminals. Like the ATAPI connector, when the number of terminals of a connector is greater than the number of input terminals of a firmware storing memory, all of the terminals of the firmware storing memory 7 can simultaneously be accessed, and the selector 15 may simply switch the output of the connector 8, thereby simplifying the structure of the selector 15. In other words, the present invention is most effective when it is applied to a controller of an information processor connected to a computer.

Therefore, the present examples and embodiments are to be considered as illustrative and not restrictive and the invention is not to be limited to the details given herein, but may be modified within the scope and equivalence of the appended claims.

What is claimed is:

1. A controller of a system connected to a memory, which stores firmware, for operating in accordance with the firmware stored in the memory, the controller comprising:
    a data processing circuit that performs predetermined processing on data and generates processed data;
    a write wire connected to the memory; and
    a terminal used for outputting the data processed by the data processing circuit and/or providing the data to the data processing circuit, wherein the controller connects the write wire and the terminal so that the firmware is directly written to the memory by an external device via the write wire.

2. A controller of a system that operates in accordance with firmware stored in a firmware storing memory, the controller comprising:
    a first terminal for receiving and providing data between the controller and an external device;
    a data processing circuit for performing predetermined processing on the data to be provided to and received from the external device via the first terminal; and
    a firmware write wire connected to the firmware storing memory, wherein the controller selectively connects the first terminal and one of the data processing circuit and the firmware write wire, wherein the controller connects the first terminal and the firmware write wire so that the firmware is directly written to the firmware storing memory by the external device.

3. The controller of claim 2, further comprising a selector connected to the data processing circuit and the firmware write wire for selectively connecting the first terminal and one of the data processing circuit and the firmware write wire in response to a switching signal.

4. The controller of claim 3, further comprising a second terminal for providing the switch signal to the selector, wherein the selector connects the data processing circuit and the first terminal when the second terminal is grounded.

5. The controller of claim 3, wherein the selector further connects the firmware write wire and the first terminal when the switching signal is active.

6. A data processing system connected to an external device via a connector for receiving and providing data between the external device, the system comprising:
 a memory for storing firmware;
 a microcomputer connected to the memory for performing control operation in accordance with the firmware stored in the memory;
 a data processing circuit connected to the microcomputer for performing predetermined processing on data to be provided to and received from the external device in accordance with the control of the microcomputer; and
 a selector connected to the data processing circuit and the memory for selectively connecting the connector and one of the data processing circuit and the memory, wherein the firmware is directly written to the memory by the external device via the connector when the selector connects the connector and the memory.

7. The data processing system of claim 6, wherein the selector switches connection in response to a switching signal, and the selector connects the connector and the data processing circuit when the switching signal is inactive.

8. The data processing system of claim 7, further comprising a terminal for providing the switching signal to the selector, wherein the selector connects the connector and the data processing circuit when the terminal is grounded.

9. The data processing system of claim 7, wherein the selector further connects the connector and the memory when the switching signal is active.

10. The data processing system of claim 6, wherein the connector includes a plurality of the terminals, and the system further comprises a plurality of firmware write wires for connecting the memory and the selector, wherein the number of the plurality of the terminals is larger than the number of the plurality of the firmware write wires.

11. The data processing system of claim 6, wherein the memory, the data processing circuit and the selector are mounted on a single LSI.

12. The data processing system of claim 6, wherein the memory, the microcomputer, the data processing circuit, and the selector are mounted on a single LSI.

* * * * *